United States Patent [19]
Hockley

[11] Patent Number: 5,699,880
[45] Date of Patent: Dec. 23, 1997

[54] BRAKE ADJUSTMENT INDICATOR

[75] Inventor: Des Hockley, North York, Canada

[73] Assignee: Mr. Safety Check Systems Inc, Concord

[21] Appl. No.: 660,223

[22] Filed: Jun. 3, 1996

[51] Int. Cl.⁶ .................................................. F16D 66/02
[52] U.S. Cl. .................................... 188/1.11; 116/208
[58] Field of Search ............................. 188/1.11 WE, 188/1.11 R, 1.11 W, 71.7, 72.9, 196 R, 196 D, 170, 366–369, 71.8–71.9, 79.55; 33/609, 556, 732, 750, 832; 116/208, 283

[56] References Cited

U.S. PATENT DOCUMENTS

| | | | |
|---|---|---|---|
| 3,438,351 | 4/1969 | Kirkwood | 116/124 |
| 3,575,268 | 4/1971 | Kimata | 188/71.8 X |
| 4,279,214 | 7/1981 | Thorn | 116/208 |
| 4,776,438 | 10/1988 | Schandelmeier | 188/1.11 |
| 4,879,964 | 11/1989 | Emerson, Jr. | 116/28 R |
| 4,991,310 | 2/1991 | Melia | 188/1.11 X |
| 5,140,932 | 8/1992 | Goldfein et al. | 188/1.11 X |
| 5,178,092 | 1/1993 | Schedin | 116/283 X |
| 5,226,509 | 7/1993 | Smith | 116/208 X |
| 5,244,061 | 9/1993 | Hoyt et al. | 188/1.11 |
| 5,320,198 | 6/1994 | Hoyt et al. | 188/1.11 |
| 5,441,128 | 8/1995 | Hoyt | 188/1.11 |

*Primary Examiner*—Josie Ballato
*Attorney, Agent, or Firm*—Philip Mendes da Costa; Bereskin & Parr

[57] ABSTRACT

A brake adjustment indicator for a braking system including a pressure chamber, a pushrod extending longitudinally outwards from the pressure chamber and moveable when correctly adjusted between first and second positions, a brake arm and a pivot for pivotally mounting the pushrod to the brake arm. The brake adjustment indicator comprises an indicator adapted to be mounted for longitudinal movement with the pushrod, a support having a first portion and a second portion, the first portion adapted to be mounted to the vehicle, the support configured to position the second portion opposite to the indicator and first and second reference pointers fixedly positionable on the second portion for marking the first and second positions. A spacer is provided for positioning the first reference pointer in a preselected position relative to the second reference pointer. The first and second reference pointers are mounted for simultaneous movement on the second portion.

20 Claims, 5 Drawing Sheets

BRAKE ADJUSTMENT INDICATOR

FIELD OF THE INVENTION

This invention relates to an air brake adjustment indicator for air brake systems of, for example, trucks, trailers and the like.

BACKGROUND OF THE INVENTION

Braking systems for trucks, trailers and the like typically utilize an air brake system having a pressure chamber, a push rod extending longitudinally outwards from the pressure chamber, a brake arm and a clevis pin for pivotally mounting the brake arm to the push rod. When the brake pedal is depressed, air pressure increases in the pressure chamber. As the air pressure increases, a diaphragm contained in the pressure chamber deforms and exerts an outward pressure on the push rod. The deformation of the diaphragm causes the push rod to move outwardly from the pressure chamber, actuating the braking mechanism. When air brake systems are properly adjusted, the push rod extends from a first position (in which the brakes are not engaged) to a second position (in which the brakes are fully engaged). Over time, as the brakes are repeatedly applied, the distance travelled by the push rod may increase requiring the brake system to be adjusted.

Some braking systems include slack adjusters. The slack adjuster is used to take up the excess clearance, i.e. the slack, caused by lining and drum wear. However, it is still important to regularly monitor the distance travelled by the push rod since this provides information regarding the degree of wear of the braking systems. Further, some jurisdictions require the operator of a truck to inspect the adjustment of the braking system before the vehicle's first trip each day.

Various devices have been developed to assist in monitoring the adjustment of brake systems.

U.S. Pat. No. 4,279,214 (Thorn) discloses a brake ware indicator comprising a sleeve that loosely fits over the push rod of the pneumatic actuator of the brakes. The sleeve has an outside diameter permitting it to be received on the aperture of the actuator housing which slidably receives the push rod.

U.S. Pat. No. 4,776,438 (Shandelmeier) discloses an air brake adjustment indicator comprising a bracket having an elongated body portion. A base plate is provided at one end for mounting on the vehicle. A pointer is adjustably mounted on the bracket at a predetermined distance from the clevis pin of the brake system in a direction opposite the air chamber when the clevis pin is in its normal, rest position.

U.S. Pat. No. 4,879,964 (Emerson, Jr.) discloses an adjustment marker comprising a chain of predetermined length which is attached to the push rod. A snap is attached to one end of the chain and a clamp is attached to the other end. An indicator flag is attached to the chain near the snap so that, when the push rod travels further than the predetermined length, the snap will release and drop the indicator flag downwardly so as to be visible to the operator of the vehicle.

U.S. Pat. No. 5,244,061 (Hoyt et al No. 1) discloses an air brake stroke length gauge comprising a stroke length indicator and a reference marker. The stroke length indicator is mounted on the push rod to move therewith. The reference marker is fixedly attached to the air brake system adjacent to the push rod at a distance which corresponds to the appropriate stroke length for the brake system when properly adjusted.

U.S. Pat. Nos. 5,320,198 (Hoyt et al No. 2) and 5,441,128 (Hoyt) disclose air brake stroke length adjustment gauges utilizing markers provided on the slack. adjuster to indicate brake wear.

One disadvantage of some of these devices is that some portions of the indicator devices are subject to movement or may fall off with use. For example, when a vehicle is being driven, the frame of the vehicle and parts attached thereto (eg. the brake and the adjustment gauge) undergo substantial vibrations. This could result in the position of the reference marker and the stroke length indicator of Hoyt et al moving and accordingly providing a false reading.

A further disadvantage of some of these devices is that a warning is only provided when the push rod extends too far. For example, the device of Emerson, Jr. only provides a warning when the snap releases and the flag falls.

A further disadvantage of some of the devices is that it is difficult for the operator to properly read the adjustment gauge. Adjustment gauges are mounted near the push rod. If the operator reads the gauge from an angle, then a false reading may be obtained. In addition, some of these devices are not readily adjustable and substantial time may be required to properly mount and set the gauges.

SUMMARY OF THE PRESENT INVENTION

In accordance with the instant invention there is provided a brake adjustment indicator for a braking system for a vehicle, the braking system including a pressure chamber, a pushrod extending longitudinally outwards from the pressure chamber and moveable when correctly adjusted between first and second positions, a brake arm and pivot means for pivotally mounting the pushrod to the brake arm, the brake adjustment indicator comprising:

(a) indicator means adapted to be mounted for longitudinal movement with the pushrod;

(b) support means having a first portion and a second portion, the first portion adapted to be mounted to the vehicle, the support means configured to position the second portion opposite to the indicator means;

(c) first reference means positionable on the second portion of the support means for marking the first position and second reference means positionable on the second portion of the support means for marking the second position;

(d) locating means for positioning the first reference means in a preselected position relative to the second reference means, the first and second reference means mounted for simultaneous movement on the second portion of the support means; and, (e) locking means for fixing the first and second reference means in position on the second portion of said support means.

In accordance with a further embodiment of this invention, there is provided a brake adjustment indicator for a braking system for a vehicle, the braking system including a pressure chamber, a rod extending longitudinally outwards from the pressure chamber and moveable when correctly adjusted between first and second positions, a brake arm and pivot means for pivotally mounting the rod to the brake arm, the brake adjustment indicator comprising:

(a) first reference means for marking the first position and second reference means for marking the second position;

(b) indicator means adapted to be mounted for longitudinal movement with the rod;

(c) support means having a first portion and a second portion, the first portion adapted to be mounted to the vehicle, the support means configured to position the second portion opposite to the indicator means, the second portion of the support means extending substantially parallel to the rod and having a longitudinally extending opening adapted to receive the first and second reference means therein for longitudinal movement of the reference means;

(d) spacer means for positioning the first reference means in a preselected position relative to the second reference means; and, (e) locking means for fixing the first and second reference means in position on the second portion of said support means.

In one embodiment, the pivot means of the brake system includes a clevis pin and the indicator means is adapted to be mounted on the clevis pin.

In another embodiment, the indicator means extends transversely from the pivot means and has an end distal to the pivot means. The distal end is preferably mounted to contact the reference means if the rod travels beyond the correctly adjusted position. To this end, the reference means may extend transversely from the second portion of the support means and have ends distal to the second portion of the support means. The end of the indicator means may be positioned nearer the second portion of the support means than the ends of the reference means. The end of the indicator means and/or the end of the reference means may be flexible. Accordingly, the when the brake system is not properly adjusted, the indicator means will contact the reference means, and if the brake is substantially out of adjustment, the indicator means will deform as it travels by the reference means so as to provide a readily observable indication to the operator that the brake requires adjustment.

One advantage of the instant invention is that it provides a gauge for measuring not only the outward travel of the push rod but also the inward travel of the push rod. If the push rod extends too far outwardly, then this provides an indication, for example, that the brake pads are worn and need replacement. Alternately, if the push rod does not fully retract, then this provides an indication, for example, that the cam, the slack adjuster or the operating shaft is broken and/or worn or that there is a malfunction in the air chamber.

A further advantage of the instant invention is that the indicator means and the reference means preferably interact when the indicator means extends past a reference means. This provides a positive visual signal, independent upon the angle from which the adjustment gauge is observed, that the brake system requires adjustment.

DESCRIPTION OF THE DRAWING

These and other features of the instant invention will be more fully understood in reference with the following description of a preferred embodiment of the invention in which.

DESCRIPTION OF PREFERRED EMBODIMENT

Figure 1:
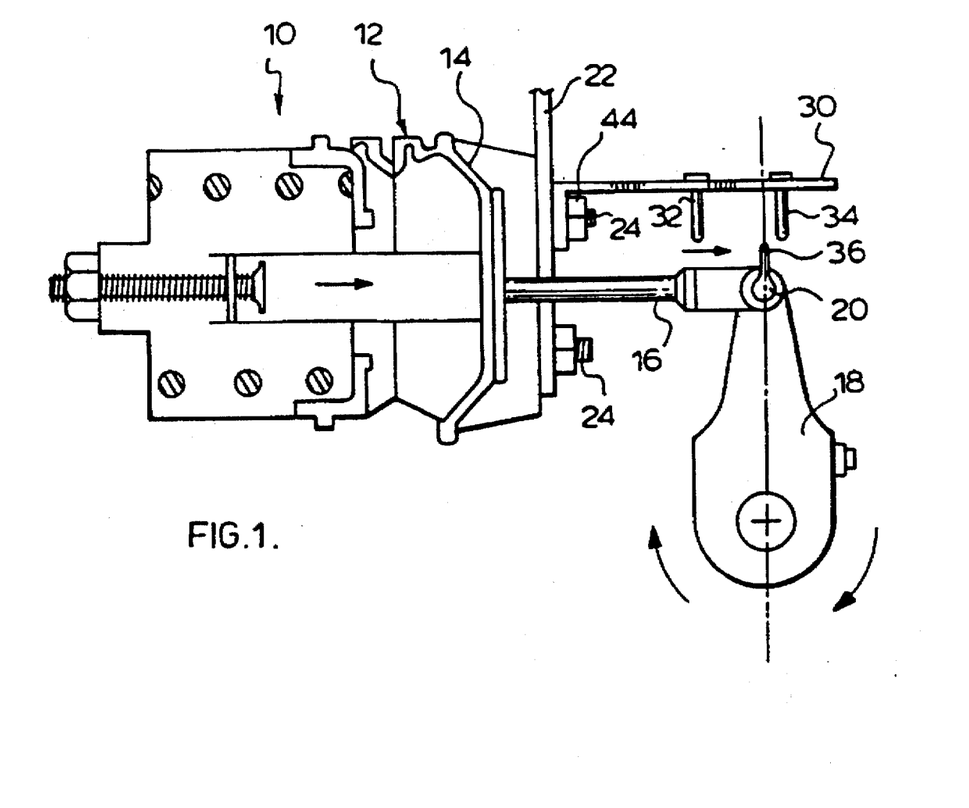
FIG. 1 is a partial cross-section of an air brake system having a brake adjustment indicator pursuant to the instant invention mounted thereon and showing a properly adjusted air brake system with the brake engaged.
Figure 2:
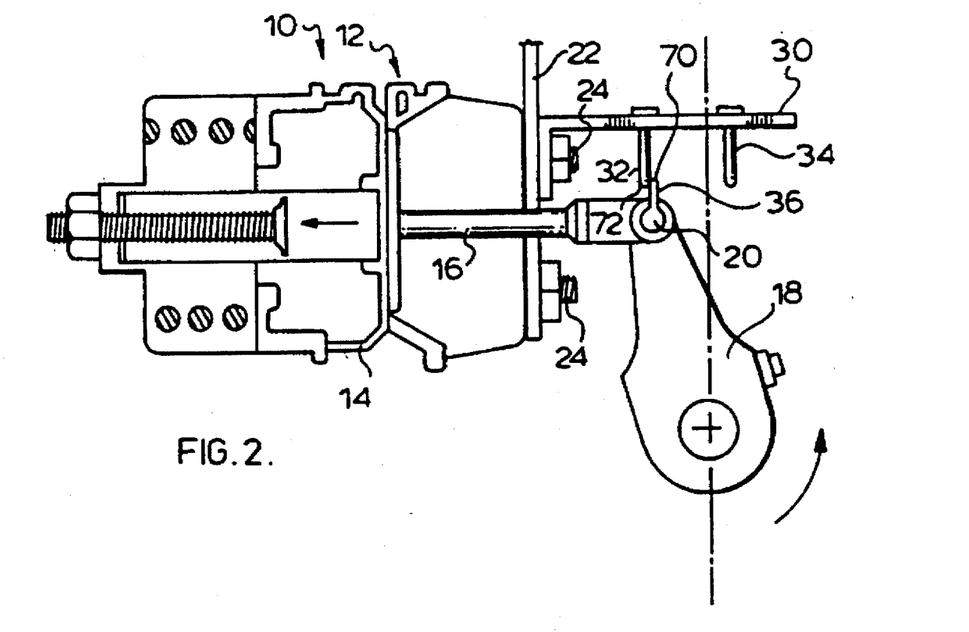
FIG. 2 shows the air brake system of FIG. 1 showing a properly adjusted air brake system with the brake disengaged.
Figure 3:
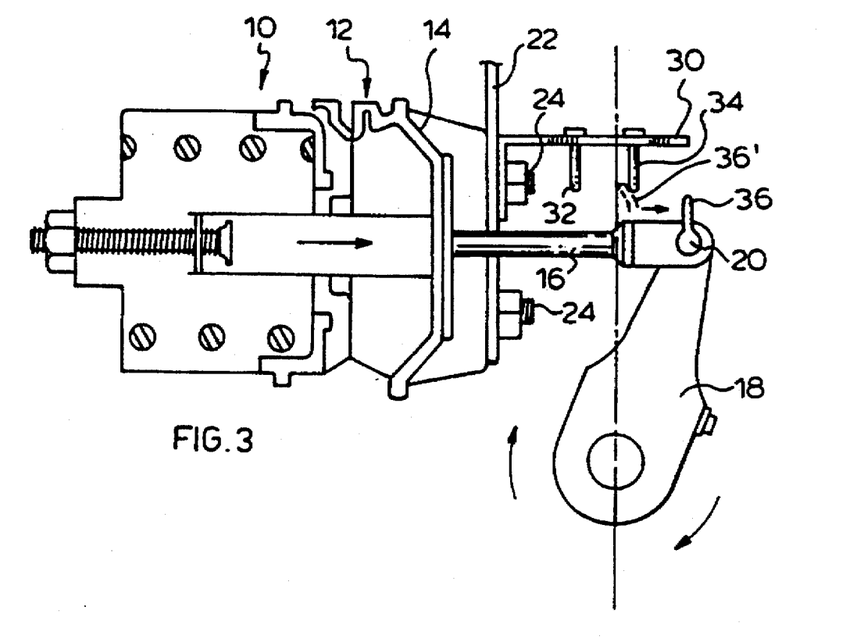
FIG. 3 shows the air brake system of FIG. 1 in which the air brake system requires adjustment.

As shown in FIGS. 1–3, braking systems for trucks, trailers and the like, generally designated by reference number 10, comprise a pressure chamber 12 having a diaphragm 14, a push rod 16 and a brake arm (which may be or which may include a slack adjuster) 18. Push rod 16 abuts against diaphragm 14 and moves longitudinally into and out of pressure chamber 12 with the respective contraction or expansion of diaphragm 14. A brake arm or slack adjuster 18 is pivotally mounted by pivot means to push rod 16 about axis 20. The pivot means may be a clevis pin as is known in the art. Brake arm 18 is connected to the braking means so that, upon movement of push rod 16, brake arm 18 causes the brake to engage or disengage, depending upon the direction of travel of push rod 16. Pressure chamber 12 may be affixed to the truck, trailer of the like by any means known in the art. As shown in FIGS. 1–3, pressure chamber 12 may be affixed to vehicle frame 22 by means of mounting bolts 24.

The brake adjustment indicator according to the instant invention comprises bracket 30, first reference pointer 32, second reference pointer 34 and indicator 36. Indicator means 36 is adapted to be mounted for longitudinal movement with push rod 16. Preferably, indicator means 36 is adapted to be mounted to the pivot means and, more preferably, the pivot means is a clevis pin. Indicator means 36 may therefore be adapted to be mounted on the clevis pin or indicator means 36 may be formed integrally with the clevis pin.

Figure 4:
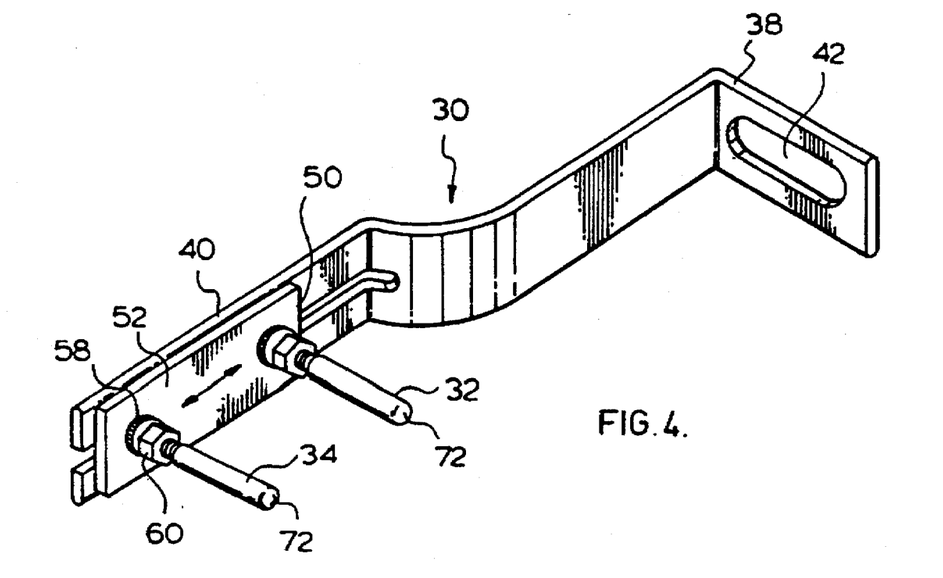
FIG. 4 is a perspective view of a support means according to the instant invention.

Bracket 30 is a support means which is adapted to be mounted to the vehicle. As shown in FIG. 4, the bracket has a first portion 38 which is adapted to mount bracket 30 on the truck, trailer or the like and the second portion 40 which is adapted to receive first and second reference pointers 32 and 34.

Bracket 30 may be mounted on the truck, trailer or the like by any means known in the art. As shown in FIG. 4, first portion 38 may have an opening 42 which is adapted to be mounted on bolt 24 as shown in FIGS. 1–3. In order to install bracket 30, nut 44 is removed from bolt 24, bracket 30 is placed so that bolt 24 extends through opening 42 and nut 44 is reapplied to bolt 24 to fix bracket 30 in position. Preferably, opening 42 is a longitudinally extending opening so that bracket 30 may be fixed to vehicle frame 22 in a variety of positions. Alternately, first portion 38 may have a plurality of openings provided therein, each of which are adapted to receive bolt 24.

Second portion 40 is adapted to receive reference pointers 32 and 34. Bracket 30 is configured so that reference pointers 32 and 34 are positioned opposite indicator means 36. Bracket 30 may be a member which extends longitudinally from bolt 24 to a position opposite the clevis pin. As shown in FIGS. 4 and 6–8, the exact configuration of bracket 30 may be varied, depending on the braking system which is used and the position at which bracket 30 is affixed to the truck, trailer of the like, so that reference pointers 32 and 34 may mark the correctly adjusted position of push rod 16.

When correctly adjusted, the push rod of the braking system typically moves between a first inner position and a second outer position. For example, if indicator 36 is mounted on the clevis pin as shown in FIGS. 1–3, then, when the brakes are correctly adjusted, indicator 36 moves longitudinally with push rod 16 to a first particular distance from pressure chamber 12 when the brakes are applied and to a second particular distance from pressure chamber 12 when the brakes are released. The actual distance which is travelled and the inner and outer positions will depend upon the braking system which is used. Each manufacturer generally indicates the correct displacement of push rod 16 when it is properly adjusted.

Second portion 40 of bracket 30 is positioned opposite indicator 36 so that, when correctly adjusted, indicator 36 will travel with push rod 16 between first and second reference pointers 32 and 34. Bracket 30 is configured to so position second portion 40. Referring to FIGS. 1–3, reference pointer 32 extends longitudinally in the plane passing transversely through push rod 16 at the correctly adjusted inner position and reference pointer 34 extends longitudinally in the plane passing transversely through push rod 16 at the correctly adjusted outer position.

If indicator 36 extends outwardly past reference pointer 34, as shown in FIG. 3, this would indicate to the operator of the vehicle that there may be excessive wear on the brakes and that, for example, the brake pads may need replacement. If, on the other hand, the indicator travels so that it does not travel to a position adjacent reference pointer 32, then this would indicate to the operator of the vehicle that the cam, the slack adjuster or the operating shaft of the braking system may be worn or broken, that there is a malfunction in pressure chamber 12 or that other parts of the braking system require maintenance. Accordingly, one advantage of the instant invention is that it provides a reference mark for both the outward position of push rod 16 when it is correctly adjusted and the inward position of travel of push rod 16 when it is operating properly.

Figure 5:
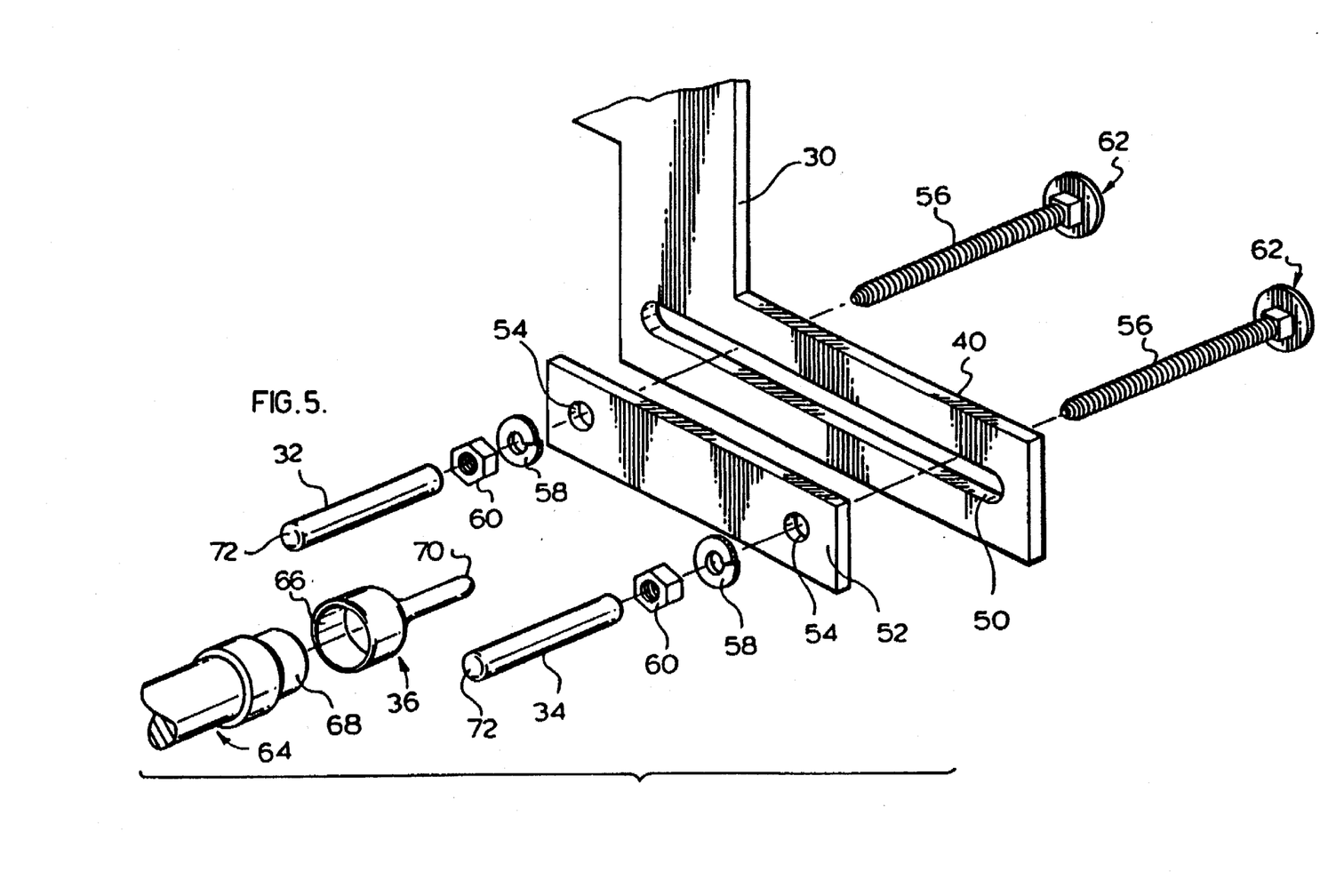
FIG. 5 is an exploded view of a support means according to the instant invention and an indicator means of the instant invention.

Referring to FIGS. 4 and 5, the construction of reference pointers 32 and 34 will be discussed. Reference pointers 32 and 34 are mounted on second portion 40 of bracket 30 a preselected distance apart. Further, reference pointers 32 and 34 are mounted for simultaneous movement on second portion 40. To this end, second portion 40 may have a longitudinally extending opening 50. Bracket 30 is configured so that opening 50 extends longitudinally, parallel to the direction of travel of push rod 16. Spacer means, comprising plate 52 having openings 54, is provided. Reference pointers 32 and 34 are slidable mounted on second portion 40 by bolts 56 which extend through longitudinally extending opening 50, through an opening 54 and into one of the reference pointers. Locking means is also provided to secure pointers 32 and 34 in position on second portion 40. Accordingly, lock washers 58 and nut 60 may be provided.

When assembled, distal end 62 of bolts 56 abuts against second portion 40. Bolts 56 pass through longitudinally extending opening 50, opening 54, lock washer 58 and nut 60 into one of reference pointers 32 and 34. By tightening nut 60 on bolt 56, plate 52, and accordingly reference pointers 32 and 34, are fixed in position on bracket 30.

Openings 54 are provided a pre-selected distance apart. The pre-selected distance depends upon the permitted travel distance of push rod 16 when it is correctly adjusted. As the permitted distance of travel of push rod 16 varies, a different plate 52 having openings 54 spaced a different preselected distance apart may be utilized. Accordingly, another advantage of the instant invention is that bracket 30 may be adapted for different braking systems by switching to a different plate 52. It will also be appreciated by those skilled in the art that plate 52 may have a plurality of openings and that the plate may be appropriately marked to indicate those openings which are to be used with different braking systems. Alternately, a ruler or the like may be provided on plate 52 with the plurality of openings so that an appropriate pair of holes 54 may be selected depending upon the distance which push rod 16 may travel.

As also shown in FIG. 5, indicator 36 may comprise a hollow cylindrical member having an opening 66 which is adapted to fit onto end 68 of clevis pin 64. Alternately, it will be appreciated by those skilled in the art that a clevis pin having an integrally formed indicator 36 may be utilized.

Figure 7:
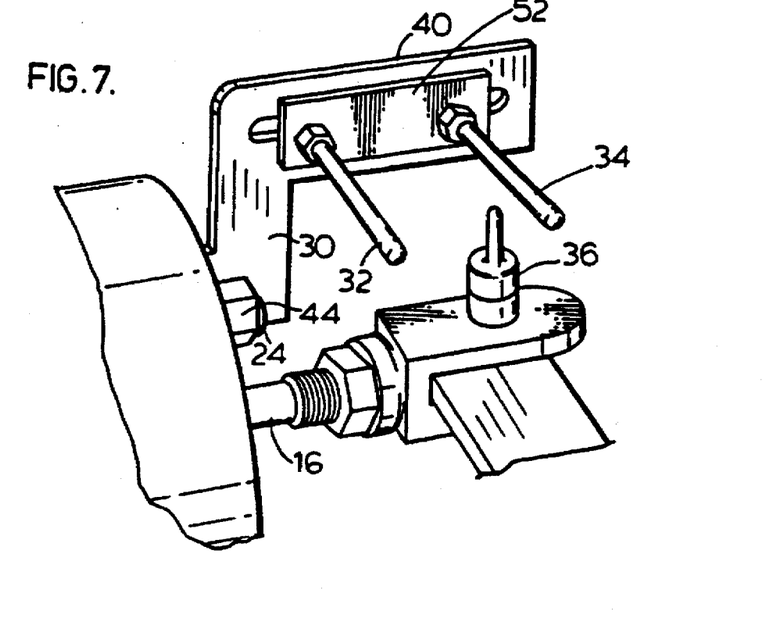
FIG. 7 is a perspective view of a brake adjustment indicator according to the instant invention mounted on a rear brake of a vehicle; and, FIG. 8 is a perspective view of a brake adjustment indicator according to the instant invention when mounted on a trailer.
Figure 8:
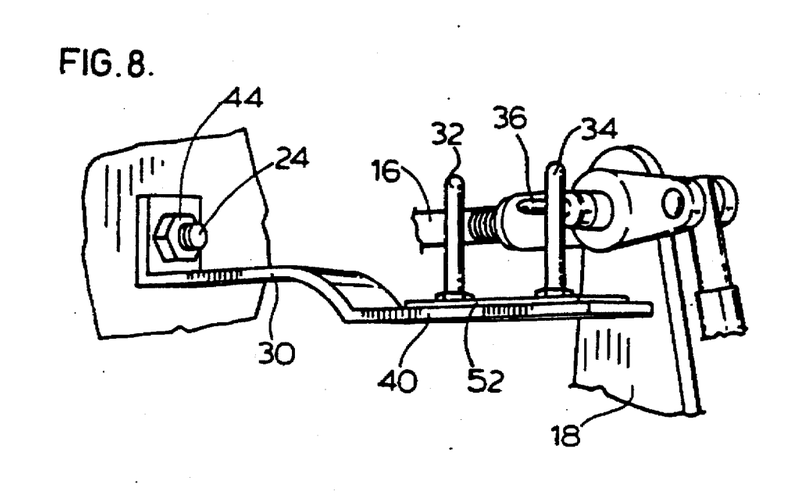

Preferably, as shown in FIG. 2, indicator 36 extends between reference pointers 32 and 34 so as to contact reference pointer 32 when push rod 16 is working properly and is fully retracted and so as to contact reference pointer 34 as push rod 16 travels outside its correctly adjusted range. Accordingly, as shown in FIG. 2, distal end 70 of indicator 36 may be positioned nearer bracket 30 than distal end 72 of pointers 32 and 34. Alternately, as shown in FIGS. 7 and 8, reference pointers 32 and 34 may be positioned perpendicular to indicator 36. In any event, it is preferred that indicator 36 is sufficiently long so as to contact reference pointers 32 and 34 as discussed above.

Preferably, indicator 36 and/or reference pointers 32 and 34 are flexible so that, when indicator 36 contacts reference pointer 34, one of reference pointer 34 and the indicator (or both) will deform to permit indicator 36 to travel past the reference pointer. Accordingly, as shown in dotted outline in FIG. 3, as indicator 36' contacts reference pointer 34, indicator 36' deforms as it travels past reference pointer 32. Once past reference pointer 32, indicator 36 will preferably return to its original shape. Therefore, it is preferred that indicator 36 and/or reference pointers 32 and 34 are made of a resilient material such as rubber, neoprene or the like.

In order to increase the visibility of indicator 36 and reference pointers 32 and 34, these members are preferably of a colour which contrasts with the colour of the braking system. Preferably, they have an exterior surface which is of a bright colour, such as yellow or the like. This increases the visibility of indicator 36 and reference pointers 32 and 34 to the operator.

Figure 6:
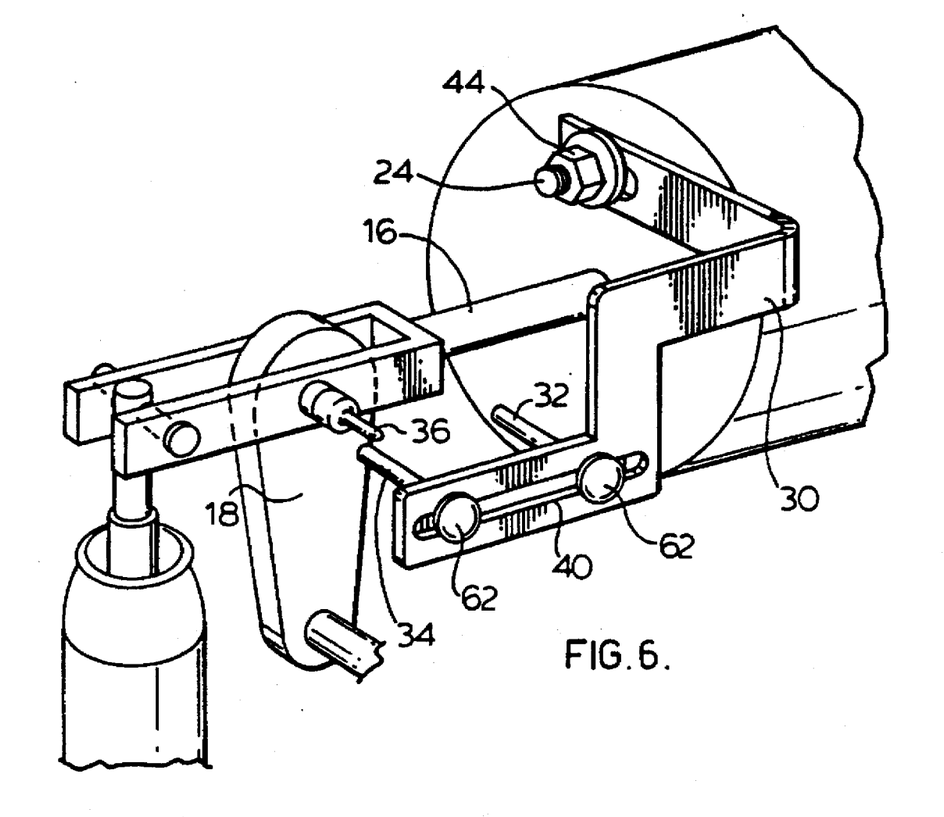
FIG. 6 is a perspective view of a brake adjustment indicator according to the instant invention mounted on a front brake of a vehicle.

In order to install the brake adjustment indicator, the vehicle, trailer or the like is stopped and the brakes are preferably chocked and disengaged. Indicator 36 may then be affixed to the clevis pin of the braking system. Alternately, if an integrally manufactured clevis pin and indicator is utilized, the clevis pin on the braking system is replaced with the new member. An appropriately configured bracket 30 is then affixed to a mounting bolt 24. FIGS. 6, 7 and 8 depict typical configurations and mountings which may be utilized. Bracket 30 is configured so that indicator 36 is positioned between reference pointers 32 and 34. As first portion 38 of bracket 30 preferably has a longitudinally extending opening, the exact position of distal ends 72 may be varied depending upon the actual construction of the brake system. The orientation of bracket 30 is also adjusted so that second portion 40 extends parallel, but distal to, push rod 16.

Reference pointers 32 and 34, if they are already positioned on second portion 40, are loosened. The reference pointers are adjusted until indicator 36 contacts (without deforming) indicator 32 (which marks the furthest inward position of travel of push rod 16 when the brakes are released). As reference pointer 34 is fixed in position relative to reference pointer 32, this will mark the furthest outward travel position of the push rod when correctly adjusted. Nuts 60 are then tightened to fix plate 52 in position relative to second portion 40.

Once the brake adjustment indicator has been installed, the operator of the vehicle may easily check the adjustment of the brakes. In order to check the degree of wear of the brakes, the operator applies the brakes and then inspects each indicator 36 to determine whether it has passed beyond the respective reference pointer 34. The operator may then chock the wheels and release the brakes. If the brakes are working properly, each indicator 36 will still be positioned adjacent the respective reference pointer 32 as shown in FIG. 2. If indicator 36 positioned between reference pointers 32 and 34, then the operator is warned that the brake may require maintenance.

By constructing reference pointers 32 and 34 and indicator 36 of a contrasting coloured material, it is easier for the operator to identify the indicators without crawling under the vehicle. Further, by constructing reference pointers 32 and 34 and indicator 36 of a flexible material and positioning indicator 36 to contact reference pointers 32 and 34, actual contact between the reference pointers and the indicator will be readily apparent to an operator without requiring the operator to be in a prescribed position to properly view the relative alignment of the reference pointers and the indicator. Further, as the brakes start to wear, excessive outward travel of pushrod 16 will result in deformation of at least one of these members. Accordingly, not only does this expedite the inspection of the brake adjustment (which may make it more likely that the operator will conduct a proper check) but it provides a more accurate indication of the actual adjustment of the brakes.

It will be appreciated by those skilled in the art that other modifications may be made to the brake adjustment indicator and are within the scope of this invention.

I claim:

1. A brake adjustment indicator for a braking system for a vehicle, the braking system including a pressure chamber, a pushrod extending longitudinally outwards from the pressure chamber and moveable when correctly adjusted between first and second positions, a brake arm and a pivot for pivotally mounting the pushrod to the brake arm, said brake adjustment indicator comprising:

(a) an indicator adapted to be mounted for longitudinal movement with the pushrod;
    (b) a support member having a first portion and a second portion, said first portion adapted to be mounted to the vehicle, said support member configured to position said second portion opposite to said indicator;
    (c) a first reference member positionable on said second portion of said support member for marking the first position and a second reference member positionable on said second portion of said support member for marking the second position;
    (d) a locating member for positioning said first reference member in a preselected position relative to said second reference member; and,
    (e) at least one locking member for releasably mounting said first and second reference members on said second portion, said locking member moveable between a first position in which said first and second reference members are fixed in position on said second portion of said support member and a second position in which said first and second reference members are moveable as a unit with respect to said indicator on said second portion.

2. The brake adjustment indicator as claimed in claim 1 wherein said indicator is adapted to be mounted on the pivot.

3. The brake adjustment indicator as claimed in claim 2 wherein said indicator is positioned between said first and second reference members to contact said second reference member as said push rod extends past said second position when said braking system is engaged and requires adjustment.

4. The brake adjustment indicator as claimed in claim 3 wherein at least one of the end of said indicator and the ends of said first and second reference members are flexible.

5. The brake adjustment indicator as claimed in claim 1 wherein the pivot includes a clevis pin and said indicator is adapted to be mounted on the clevis pin.

6. The brake adjustment indicator as claimed in claim 1 wherein the pivot includes a clevis pin, said second portion of said support member extends substantially parallel to the push rod and said indicator is adapted to be mounted on the clevis pin.

7. The brake adjustment indicator as claimed in claim 6 wherein (a) said locating member comprises a plate having first and second openings, said openings being adapted to each receive one of said first and second reference members, said openings positioned a preselected distance apart so that when said first and second reference members are positioned in said openings, said first reference member is in said preselected position relative to said second reference member, and
    (b) said second portion includes a longitudinally extending opening, said longitudinally extending opening adapted to receive said indicator for slidable movement therein.

8. The brake adjustment indicator as claimed in claim 1 wherein said first portion is adapted to be mounted to the pressure chamber.

9. The brake adjustment indicator as claimed in claim 1 wherein the pressure chamber is mounted to the vehicle by a mounting bolt and said first portion is adapted to be mounted to the pressure chamber by the mounting bolt.

10. The brake adjustment indicator as claimed in claim 1 wherein said locating member comprises a plate having first and second openings, said openings being adapted to each receive one of said first and second reference members, said openings positioned a preselected distance apart so that when said first and second reference members are positioned in said openings, said first reference member is in said preselected position relative to said second reference member.

11. The brake adjustment indicator as claimed in claim 10 wherein said second portion includes a longitudinally extending opening, said longitudinally extending opening adapted to receive said first and second reference members for slidable movement therein.

12. The brake adjustment indicator as claimed in claim 1 wherein said indicator and said first and second reference members each have an exterior surface which is of a colour that contrasts with the colour of the braking system.

13. A brake adjustment indicator for a braking system for a vehicle, the braking system including a pressure chamber, a rod extending longitudinally outwards from the pressure chamber and moveable when correctly adjusted between first and second positions, a brake arm and a pivot for pivotally mounting the rod to the brake arm, said brake adjustment indicator comprising:

(a) a first reference member for marking the first position and a second reference member for marking the second position;

(b) an indicator adapted to be mounted for longitudinal movement with the rod;

(c) a support member having a first portion and a second portion, said first portion adapted to be mounted to the vehicle, said support member configured to position said second portion opposite to said indicator, said second portion of said support member extending substantially parallel to the rod and having a longitudinally extending opening adapted to receive said first and second reference members therein for longitudinal movement of said first and second reference members;

(d) a spacer for positioning said first reference member in a preselected position relative to said second reference member; and, (e) a locking member moveable between a first position in which said first and second reference members are fixed in position on said second portion of said support member and a second position in which said first and second reference members are moveable as a unit in said longitudinally extending opening.

14. The brake adjustment indicator as claimed in claim 13 wherein said indicator is adapted to be mounted on the pivot.

15. The brake adjustment indicator as claimed in claim 14 wherein the pivot includes a clevis pin and said indicator is adapted to be mounted on the clevis pin.

16. The brake adjustment indicator as claimed in claim 14 wherein the pressure chamber is mounted to the vehicle by at least one mounting bolt and said first portion is adapted to be mounted to the pressure chamber by one of said at least one of said mounting bolts.

17. The brake adjustment indicator as claimed in claim 14 wherein said spacer comprises a plate having first and second sides and first and second openings, said first and second reference members extending through said longitudinally extending opening of said support member and said first and second openings, said first and second openings positioned a preselected distance apart to position said first reference member in said preselected position relative to said second reference member.

18. The brake adjustment indicator as claimed in claim 14 wherein said indicator and said first and second reference members each have an exterior surface which is of a colour that contrasts with the colour of the braking system.

19. The brake adjustment indicator as claimed in claim 14 wherein said indicator is positioned between said first and second reference members to contact said second reference members as said push rod extends past said second position when said braking system is engaged and requires adjustment.

20. The brake adjustment indicator as claimed in claim 19 wherein at least one of the end of said indicator and the ends of said first and second reference members are flexible.

* * * * *